United States Patent [19]

Kim et al.

[11] Patent Number: 5,314,933
[45] Date of Patent: May 24, 1994

[54] ANAEROBIC CURING COMPOSITIONS COMPRISING A LUTIDINE

[75] Inventors: Deog-Il Kim, Seoul; Pil-Gyou Kwak; O-Gyoon Park, both of Suwon, all of Rep. of Korea

[73] Assignee: SKC Limited, Kyungki, Rep. of Korea

[21] Appl. No.: 42,140

[22] Filed: Apr. 2, 1993

[30] Foreign Application Priority Data

Apr. 7, 1992 [KR] Rep. of Korea ............... 92-5781

[51] Int. Cl.$^5$ ............ C09J 4/00; C08F 4/00; C08F 4/32
[52] U.S. Cl. .................. 523/176; 526/204; 526/230; 526/232; 526/232.1; 526/320; 526/323.1
[58] Field of Search ............ 523/176; 526/204, 230, 526/232, 232.1, 320, 323.1

[56] References Cited

U.S. PATENT DOCUMENTS

| | | | |
|---|---|---|---|
| 2,628,178 | 2/1953 | Burnett | 523/176 |
| 2,895,950 | 7/1959 | Krieble | 526/323.1 |
| 3,046,262 | 7/1962 | Krieble | 526/320 |
| 3,218,305 | 11/1965 | Krieble | 526/320 |
| 4,044,044 | 8/1977 | Saito | 526/278 |
| 4,322,509 | 3/1982 | Zalucha | 525/287 |
| 4,695,508 | 9/1987 | Kageyama et al. | 428/261 |
| 4,755,571 | 7/1988 | Irving et al. | 523/176 |

FOREIGN PATENT DOCUMENTS 89028309 8/1990 Australia .
0113276 7/1983 Japan .

Primary Examiner—Paul R. Michl
Assistant Examiner—Tae H. Yoon
Attorney, Agent, or Firm—William F. Pinsak

[57] ABSTRACT

The present invention provides an anaerobic curing composition comprising a monofunctional or multifunctional acrylate or methacrylate as a polymerizable monomer having at least one functional vinyl group, 0.1 to 10 percent by weight of an organic peroxide and 0.1 to 10 percent by weight of at least one aromatic amine having a pKa of 6.5 to 9.0, based on the total weight of the monomer, which may be stored as a liquid for a long time and cures rapidly at anaerobic conditions, to form a strong bond between adjacent surfaces of, especially, metals, so that it is useful as an adhesive and sealant for metals.

1 Claim, No Drawings

ANAEROBIC CURING COMPOSITIONS COMPRISING A LUTIDINE

FIELD OF THE INVENTION

The present invention relates to polymerizable compositions; and, more particularly, to anaerobic curing compositions comprising polymerizable monomers, organic peroxides and aromatic amine compounds, which are useful as adhesive and sealants for bonding adjacent surfaces of various materials.

BACKGROUND OF THE INVENTION

Anaerobic curing compositions comprise polymerizable monomers and their curing effect is achieved through a polymerization mechanism which is inhibited by oxygen. Such anaerobic compositions remain as an unpolymerized liquid as long as adequate contact with oxygen or air is maintained and cure spontaneously to a solid state upon the exclusion of oxygen or air.

The anaerobic curing compositions are useful for locking threaded assemblies, sealing porous and flanged assemblies, and, in particular, bonding adjacent surfaces of metals such as threads of a bolt and a nut.

U.S. Pat. No. 2,628,178 discloses oxygenated polyacrylate monomers showing anaerobic curing properties. However, the compositions containing these monomers require a continuous supply of air through them to prevent their polymerization and solidification during storage.

U.S. Pat. No. 2,898,950 describes anaerobic curing compositions containing unoxygenated polyacrylate monomers which are polymerized rapidly and spontaneously to a solid state in the presence of an organic peroxide catalyst upon the exclusion of air or oxygen therefrom. These compositions possess an adequate shelf-stability without the supply of air as long as adequate contact with air is maintained.

U.S. Pat. No. 3,046,262 teaches anaerobic curing compositions comprising imide and/or formamide as an accelerator. However, while the accelator may promote the curing rate, it also tends to lower the shelf stability.

U.S. Pat. No. 3,218,305 provides anaerobic curing compositions having excellent shelf-stability and being capable of rapidly polymerized which comprise, in admixture, monomers, hydroperoxide catalysts, sulfimides, stabilizers including quinone, and organic amines.

U.S. Pat. No. 4,044,044 discloses the addition of certain organophosphorus ester to anaerobic adhesive and sealant compositions to increase adhesiveness. However, these resulting compositions have several deficiencies including the fact that they require a significantly increased curing time and a high curing temperature in excess of 100° C.

U.S. Pat. No. 4,322,509 suggests that the incorporation of an effective amount of carboxylated nitrile elastomer into an anaerobic composition containing an anaerobically polymerizable material having a terminal ethylenically unsaturated group, a polymerization initiator, an organophosphorus ester and a tertiary dimethylarylamine eliminates the undesired gel formation. However, as more components are added to the anaerobic curing composition, its shelf stability normally becomes deteriorated.

SUMMARY OF THE INVENTION

The object of the present invention, therefore, is to provide an improved anaerobic curing composition for an adhesive and sealant which can be stored as a liquid with a long shelf life with the ability to rapidly cure and form a strong bond between adjacent surfaces of various materials at a room temperature.

In accordance with one aspect of the present invention, there is provided an anaerobic curing composition which comprises a monofunctional or multifunctional polymerizable monomer having at least one vinyl functional group, an organic peroxide and at least one aromatic amine having its pKa value in the range of 6.5 to 9.0.

DETAILED DESCRIPTION OF THE INVENTION

Specifically, in accordance with one aspect of the present invention, there is provided an anaerobic curing composition which comprises a monofunctional or multifunctional acrylate or methacrylate as a polymerizable monomer having at least one vinyl functional group, 0.1 to 10 percent by weight of an organic peroxide and 0.1 to 10 percent by weight of at least one aromatic amine having pKa in the range of 6.5 to 9.0, based on the total weight of the monomer.

The aromatic amine useful in the novel composition may be preferably selected from pyridine derivatives substituted with at least one substituent, in particular, lutidine and imidazoles having the following formula(I):

wherein, $R_1$ and $R_2$ are independently a hydrogen or an alkyl or aryl group.

In formula(I), $R_1$ is preferably a hydrogen or a methyl, ethyl, isopropyl, undecanyl, heptadecanyl or phenyl group and $R_2$ is preferably a hydrogen; or $R_1$ is preferably an ethyl or phenyl group and $R_2$ is preferably a methyl group.

The pKa value of the aromatic amine is critical to the present invention since if it is below 6.5, its shelf-stability may become compromised due to &he increase of acidity; whereas if it is above 9.0, its initial adhesiveness becomes poor.

The polymerizable acrylate or methacrylate monomer useful in the present invention may be a monofunctional or multifunctional monomer, which may be used alone or in combination. Such representative monofunctional monomer may include: 2-hydroxy ethyl acrylate, 2-hydroxy propyl acrylate, 3-hydroxy propyl acrylate, 3-chloro-2-hydroxy acrylate, 2-hydroxy ethyl methacrylate, 2-hydroxy propyl methacrylate, 3-hydroxy propyl methacrylate, 3-chloro-2-hydroxy methacrylate, glycidyl methacrylate, tetrahydro furfuryl methacrylate, cyclohexyl metacrylae and the like.

Exemplary multifunctional monomers which may be used in the present composition include: ethyleneglycol diacrylate, diethylene glycol diacrylate, triethylene qlycol diacrylate, tetraethyleneglycol diacrylate, ethylene glycol dimethacrylate, diethylene glycol dimethacrylate, triethylene glycol dimethacrylate, tetraethylene glycol dimethacrylate, tripropylene glycol dimethacrylate, tetrapropylene glycol dimethacrylate, bisphenol A dioxy diethylene glycol dimethacrylate, bisphenol A dioxy dipropoxy di(2-hydroxy) propyl dimethacrylate, trimethylol propane trimethacrylate, pentaerythritol trimethacrylate, diglycerol tetramethacrylate and the like.

Among said monofunctional and multifunctional monomers, preferred are those having a hydroxyl group in the molecule, and containing a stabilizer or inhibitory agent such as hydroquinone; and usable without further purification.

Representative organic peroxides useful as a polymerization initiator in the present invention may include: tertiary butyl hydroperoxide, cumene hydroperoxide, tertiary butyl peroxide, cumene peroxide, benzoyl peroxide and the like, with tertiary butyl hydroperoxide and cumene hydroperoxide being preferred.

The organic peroxide as a polymerization initiator and the aromatic amine as a accelerator are employed in an amount of 0.1 to 10 percent by weight, respectively, based on the total weight of the monomer, since the use o±less than 0.1 percent by weight causes a poor initial curing rate, whereas the use of more than 10 percent by weight deteriorates significantly a shelf stability. Preferably both compounds are employed in an amount of equivalent mole.

The anaerobic curing composition of the present invention may further contain, in addition to the above components, a thickener, a polymerization inhibitor, a stabilizer and the like.

The following Examples are intended to further illustrate the present invention and are not to be construed as limiting the scope of the invention.

The properties of the composition prepared in the Examples were evaluated in accordance with &he following &est conditions and methods.

1. Adhesiveness

The adhesiveness of the inventive composition was determined after several drops of the composition were placed on the mating threads of a nut and a bolt made of Fe or Zn and cured at a room temperature.

"Breakaway torque" is defined as the torque measured at the turning point of a nut and "prevailing torque" is defined as the torque required to turn a bolt at a specific angle such as 90°, 180°, 270° and 360°. Typically, the torque of 13.84 kg·f·cm on ⅜ inch bolts and nuts is considered satisfactory.

2. Shelf stability

The shelf stability of the instant composition was measured by determining the start point of gelling during the polymerization of the anaerobic curing composition in a thermostat chamber maintained at 82° C.

EXAMPLE 1

To 60 g of a commercial grade of hydroxypropyl methacrylate monomer was added 600 mg(3.94 mmole) of cumene hydroperoxide; and the resultant mixture was stirred to be homogeneous and divided into four equal portions. To each of the four portions were added 133 mg(0.98 mmole) of N,N-dimethyl-4-toluidine (Sample 1-1); 133 mg(0.98 mmole) of N,N-dimethyl-4-toluidine and 50 mg of benzoic sulfimide(Sample 1-2); 81 mg(0.98 mmole) of 2-methylimidazole(Sample 1-3); and 108 mg(0.98 mmole) of 2-isopropyl imidazole(Sample 1-4), respectively. Samples 1-1 to 1-4 were tested for the adhesiveness and the shelf stability, and the results are shown in Table 1.

TABLE 1

| Example - Sample No. | Shelf Stability (gellation time) | Prevailing Torque (kg · f · cm, 90° turn after 4 hours) | |
|---|---|---|---|
| | | Fe | Zn |
| 1-1 | ≧1 day | 0 | 0 |
| 1-2 | 140 min | 330 | 365 |
| 1-3 | ≧1 day | 365 | 355 |
| 1-4 | ≧1 day | 370 | 360 |

EXAMPLE 2

To 45 g of a commercial grade of tetraethyleneglycol dimethacrylate monomer was added 450 mg(2.96 mmole) of cumene hydroperoxide; and the resultant mixture was stirred to be homogeneous and divided into three equal portions. To each of the three portions were added 133 mg(0.98 mmole) of N,N-dimethyl-4-toluidine (Sample 2-1); 133 mg(0.98 mmole) of N,N-dimethyl-4-toluidine and 50 mg of benzoic sulfimide(Sample 2-2); and 108 mg(0.98 mmole)of 2-isopropyl imidazole(Sample 2-3), respectively. Samples 2-1, 2-2 and 2-3 were tested for the adhesiveness and the shelf stability, and the results are given in Table 2.

EXAMPLE 3

To 60 g of a commercial grade of 3-chloro-2-hydroxypropyl methacrylate was added 600 mg(3.94 mmole) of cumene hydroperoxide. The obtained mixture was stirred to be homogeneous and divided into four equal portions.

To each of the four portions were added 133 mg(0.98 mmole) of N,N-dimethyl-4-toluidine(Sample 3-1); 133 mg(0.98 mmole) of N,N-dimethyl-4-toluidine and 50 mg of benzoic sulfimide(Sample 3-2); 108 mg(0.98 mmole) of 2-isopropyl imidazole(Sample 3-3); and 105 mg(0.98 mmole) of 2,6-lutidine(Sample 3-4), respectively. Samples 3-1 to 3-4 were tested for the adhesiveness and the shelf-stability, and the results are given in Table 2 below.

EXAMPLE 4

To a mixture of 30 g of a commercial grade of bisphenol A dioxy dipropoxy di(2-hydroxy) propyl dimethacrylate and 15 g of 2-hydroxy ethyl methacrylate was added 450 mg (2.96 mmole) of cumene hydroperoxide. The resulting mixture was stirred to be homogeneous and divided into three equal portions.

To each of the three portions was added 133 mg (0.98 mmole) of N,N-dimethyl-4-toluidine (Sample 4-1); 133 mg (0.98 mmole) of N,N-dimethyl-4-toluidine and 50 mg of benzoic sulfimide (Sample 4-2); and 108 mg (0.98 mmole) of 2-isopropyl imidazole (Sample 4-3), respectively. Samples 4-1, 4-2 and 4-3 were tested for the adhesiveness and the shelf-stability, and the results are given in Table 2 below.

TABLE 2

| Example - Sample No. | Shelf Stability (gellation time) | Breakaway Torque (kg · f · cm, 90° turn after 4 hours) | |
|---|---|---|---|
| | | Fe | Zn |
| 2-1 | ≧1 day | 0 | 0 |
| 2-2 | 120 min | 65 | 67 |
| 2-3 | ≧1 day | 50 | 30 |
| 3-1 | not determined | 0 | 0 |
| 3-2 | 45 min | 320 | 260 |
| 3-3 | 55 min | 330 | 280 |
| 3-4 | 60 min | 290 | 250 |

TABLE 2-continued

| Example - Sample No. | Shelf Stability (gellation time) | Breakaway Torque (kg · f · cm, 90° turn after 4 hours) | |
|---|---|---|---|
| | | Fe | Zn |
| 4-1 | not determined | 0 | 0 |
| 4-2 | 10 min | 135 | 170 |
| 4-3 | 15 min | 250 | 180 |

As can be seen from Tables 1 and 2, the composition comprising a polymerizable monomer and an organic peroxide in combination with aromatic amine having a pKa value of 6.5 to 9.0 such as imidazole or piridine derivative exhibits excellent adhesiveness and shelf stability as compared with those comprising an organic amine and a sulfimide accelerator.

The anaerobic curing adhesive and sealant composition in accordance with the present invention cures rapidly at anaerobic conditions to provide strong bonds between adjacent surfaces of, especially, metals, and can be stored in a liquid state for a long time.

While the invention has been described in connection with the above specific embodiments, it should be recognized that various modifications and changes may be made and also fall within the scope of the invention as defined by the claims that follow.

What is claimed is:

1. An anaerobic curing composition which comprises a monofunctional of polyfunctional acrylate or methacrylate monomer having at least one vinyl functional group, 0.1 to 10 percent by weight of an organic peroxide and 0.1 to 10 percent by weight of a lutidine having a pKa value in the range of 6.5 to 9.0, based on the total weight of the monomer, wherein the organic peroxide and the lutidine are employed in an amount of equivalent mole.

* * * * *